(12) United States Patent
Shank

US010210228B2

(10) Patent No.: US 10,210,228 B2
(45) Date of Patent: *Feb. 19, 2019

(54) FEDERATED MANAGEMENT OF A PLURALITY OF METADATA STORAGE MECHANISMS

(71) Applicant: International Business Machines Corporation, Armonk, NY (US)

(72) Inventor: Charles K. Shank, Downingtown, PA (US)

(73) Assignee: International Business Machines Corporation, Armonk, NY (US)

(*) Notice: Subject to any disclaimer, the term of this patent is extended or adjusted under 35 U.S.C. 154(b) by 935 days.

This patent is subject to a terminal disclaimer.

(21) Appl. No.: 14/725,684

(22) Filed: May 29, 2015

(65) Prior Publication Data
US 2016/0092533 A1    Mar. 31, 2016

Related U.S. Application Data

(63) Continuation of application No. 14/500,507, filed on Sep. 29, 2014.

(51) Int. Cl.
*G06F 17/30* (2006.01)

(52) U.S. Cl.
CPC .............. *G06F 17/30566* (2013.01)

(58) Field of Classification Search
CPC .......... G06F 17/3033; G06F 17/30566; G06F 17/30516; G06F 17/30545; G06Q 10/10
IPC ................ G06F 17/3033,17/30516, 17/30545, 17/30566
See application file for complete search history.

(56) References Cited

U.S. PATENT DOCUMENTS

| | | |
|---|---|---|
| 5,596,744 A | 1/1997 | Dao et al. |
| 6,061,515 A | 5/2000 | Chang et al. |
| 7,373,350 B1 | 5/2008 | Arone et al. |
| 8,099,779 B2 | 1/2012 | Owen et al. |
| 8,112,424 B2 | 2/2012 | Hurst et al. |
| 8,171,337 B2 | 5/2012 | Peters et al. |
| 8,364,720 B2 | 1/2013 | Levy |
| 2010/0125545 A1* | 5/2010 | Navas ............... G06F 17/30516 707/602 |
| 2012/0226770 A1 | 9/2012 | Schapira et al. |

(Continued)

OTHER PUBLICATIONS

Final Office Action, dated Aug. 15, 2017, for U.S. Appl. No. 14/500,50, U.S. Appl. No. 14/500,507, filed Sep. 29, 2014 by C.K. Shank, Total 13 pp.

(Continued)

*Primary Examiner* — Ashish Thomas
*Assistant Examiner* — Mellissa M. Ohba
(74) *Attorney, Agent, or Firm* — Rabindranath Dutta Konrad, Raynes, Davda & Victor LLP

(57) ABSTRACT

Metadata is managed for different distributed federated workspaces. A distributed metadata infrastructure is provided for supporting at least two different distributed federated workspaces. The distributed metadata infrastructure monitors the at least two different distributed federated workspaces to identify common metadata between the at least two different distributed federated workspaces. The distributed metadata infrastructure presents a consistent view of the common metadata.

10 Claims, 10 Drawing Sheets

---

┌─ 600
│ Operations Performed by the Remote System
│
│ 1. Create classes to represent the corpus of information required for the system.
│ 2. For each class, $X$, define the attributes and associations of interest.
│ 3. If the class $X$ is intended to be shared with *Central*, find a class, $Y$ in $C$ such that $Map(X)$ holds.
│ 4. For each class, $X$, select an attribute to serve as an element, $i$ in the identity string $I$ for instances of that class.
│ (a) If class $X$ is mapped such that $Map(X) = Y$, the selected identity attribute $i$ should be semantically compatible with the identity attribute previously defined for $Y$.
│ 5. Define an identity ordering amongst classes. This typically follows abstractions like containment.
│ 6. Let the identity, $I$ for any object of a particular class be its identity, $i$, concatenated to $Pred(i)$.
│ 7. In some cases, $I_{remote}$ for a class $X$ in *Remote* where there exists an $Y$ in *Central* such that $Y = Map(X)$, can have additional attribute elements in its Identity. This produces the case where
│ $I_{remote} = Covers(I_{central})$
└─

(56) References Cited

U.S. PATENT DOCUMENTS

2013/0041872 A1    2/2013    Aizman et al.

OTHER PUBLICATIONS

Response to Final Office Action, dated Nov. 15, 2017, for U.S. Appl. No. 14/500,507, filed Sep. 29, 2014 C.K. Shank, Total 11 pp.
Office Action 1, dated Feb. 7, 2017, for U.S. Appl. No. 14/500,507, filed Sep. 29, 2014 by C.K. Shank, 18 pp.
Response to Office Action 1, dated May 8, 2017, for U.S. Appl. No. 14/500,507, filed Sep. 29, 2014 by C.K. Shank, Total 9 pp.
Chan, L.M. and M.L. Zeng, "Metadata Interoperability and Standardization—A Study of Methodology Part 1", [online], [Retrieved on Sep. 29, 2014]. Retrieved from the Internet at <URL: http://www.dlib.org/dlib/june06/chan/06chan.html>, D-Lib Magazine, Jun. 2006, vol. 12, No. 6, ISSN 1082-9873, Total 18 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Jan. 2011, Computer Security Division Information Technology Laboratory National Institute of Standards and Technology, Total 7 pp.
Wilson, E., S. Vibhute, C. Bhatia, R. Jain, L. Perniu, S. Raveendramurthy, and R. Samuel, "Getting Started with InfoSphere Data Architect", First Edition, Jun. 2011, © IBM Corporation 2011, Total 174 pp.
U.S. Appl. No. 14/500,507, filed Sep. 29, 2014, entitled, "Federated Management of a Plurality of Metadata Storage Mechanisms", invented by Charles K. Shank, Total 35 pp.
List of IBM Patents or Patent Applications Treated as Related, May 29, 2015, Total 2 pp.
Preliminary Amendment, May 29, 2015, for U.S. Appl. No. 14/500,507, filed Sep. 29, 2014 by C.K. Shank, Total 5 pp.
Office Action 3, dated Dec. 15, 2017, for U.S. Appl. No. 14/500,507, filed Sep. 29, 2014 by C.K. Shank, Total 17 pp.
Response to Office Action 3, dated Mar. 15, 2018, for U.S. Appl. No. 14/500,507, filed Sep. 29, 2014 by C.K. Shank, Total 11 pp.
Notice of Allowance for U.S. Appl. No. 14/500,507, pp. 25, dated Jul. 13, 2018.

* cited by examiner

Operations of the Central System — 500

1. Create classes to represent the corpus of information required for the system. — 502
2. For each class, define the attributes and associations of interest. — 504
3. For each class, select an attribute to serve as an element, $i$ in the identity string $I$ for instances of that class. — 506
4. Define an identity ordering amongst classes. This typically follows abstractions like containment. — 508
5. Let the identity, $I$ for any object of a particular class be its identity, $i$, concatenated to $Pred(i)$. — 510

FIG. 5

Operations Performed by the Remote System

1. Create classes to represent the corpus of information required for the system.
2. For each class, $X$, define the attributes and associations of interest.
3. If the class $X$ is intended to be shared with Central, find a class, $Y$ in $C$ such that $Map(X)$ holds.
4. For each class, $X$, select an attribute to serve as an element, $i$ in the identity string $I$ for instances of that class.
  (a) If class $X$ is mapped such that $Map(X) = Y$, the selected identity attribute $i$ should be semantically compatible with the identity attribute previously defined for $Y$.
5. Define an identity ordering amongst classes. This typically follows abstractions like containment.
6. Let the identity, $I$ for any object of a particular class be its identity, $i$, concatenated to $Pred(i)$.
7. In some cases, $I_{remote}$ for a class $X$ in Remote where there exists an $Y$ in Central such that $Y = Map(X)$, can have additional attribute elements in its Identity. This produces the case where
$I_{remote} = Covers(I_{central})$

FEDERATED MANAGEMENT OF A PLURALITY OF METADATA STORAGE MECHANISMS

CROSS-REFERENCE TO RELATED APPLICATIONS

This application is a continuation of application Ser. No. 14/500,507 filed on Sep. 29, 2014, which is incorporated herein by reference in its entirety.

BACKGROUND

1. Field

Embodiments are related to the federated management of a plurality of metadata storage mechanisms.

2. Background

A federated repository is a type of database management system (DBMS) that maps a plurality of autonomous database systems into a single federated repository. The constituent database systems may be interconnected via a computer network and may be geographically decentralized. The constituent database systems remain autonomous and do not undergo merger. The federated repository (also referred to as a federated database system) is a composite of all of the constituent database systems.

Through data abstraction, federated database systems may provide a uniform user interface, enabling users to store and retrieve data from a plurality of database systems with a single query. The single query may be used even if the constituent database systems are heterogeneous. The federated database system may decompose the query into sub-queries for submission to the relevant constituent database systems, after which the federated database system may generate a composite result from the responses to the sub-queries.

SUMMARY OF THE PREFERRED EMBODIMENTS

Provided are a method, a system, and a computer program for managing metadata for different distributed federated workspaces. A distributed metadata infrastructure is provided for supporting at least two different distributed federated workspaces. The distributed metadata infrastructure monitors the at least two different distributed federated workspaces to identify common metadata between the at least two different distributed federated workspaces. The distributed metadata infrastructure presents a consistent view of the common metadata.

In certain embodiments, the at least two different distributed federated workspaces are disjoint.

In additional embodiments, one or more federated workspaces are assembled into groups based on at least one of topic, project or activity to dispatch distributed queries.

In further embodiments, the monitoring utilizes a persistence layer in a workspace to achieve metadata liveness.

In yet further embodiments, the persistence layer is used at an edge, and the persistence layer that is used at the edge is maintained in a cloud computing environment.

In certain embodiments, a universally unique identifier (UUID) is utilized to uniquely reference an object common to the least the two different distributed federated workspaces.

In further embodiments, a workspace in the at least two different federated workspaces has objects selected from a group consisting of documents, files, directories, videos, communities, and applications.

BRIEF DESCRIPTION OF THE DRAWINGS

Referring now to the drawings in which like reference numbers represent corresponding parts throughout:

FIG. 5 illustrates a block diagram that shows operations performed by a central system, in accordance with certain embodiments;

FIG. 6 illustrates a block diagram that shows operations performed by a remote system, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Distributed Metadata Architectures

Provided is a distributed metadata architecture comprising a plurality of metadata workspaces. Each workspace may function as a distinct metadata store for a variety of purposes. Metadata is managed but is still essentially, "live.", i.e., the metadata may be changed and operations, such as queries, may be performed on the metadata in an expeditious manner.

In certain embodiments, at least two different distributed federated workspaces are monitored to identify common metadata between at the least two different distributed federated workspaces. A consistent view of the metadata is presented.

Provided also is a monitoring mechanism that uses a persistence layer (at an edge) in a workspace while allowing metadata to be "live", i.e., the metadata may be changed and operations may be performed on the metadata. A universally unique identifier (UUID) is used to uniquely reference an object common to the at least two different distributed federated workspaces. The at least two distributed federated workspaces may be disjoint. Assembling federated workspaces into groups allows queries to be dispatched to a subset of workspaces, based on topic, project, and activity, aiding in the overall performance and scalability of the distributed metadata architecture.

Exemplary Embodiments

Figure 1:
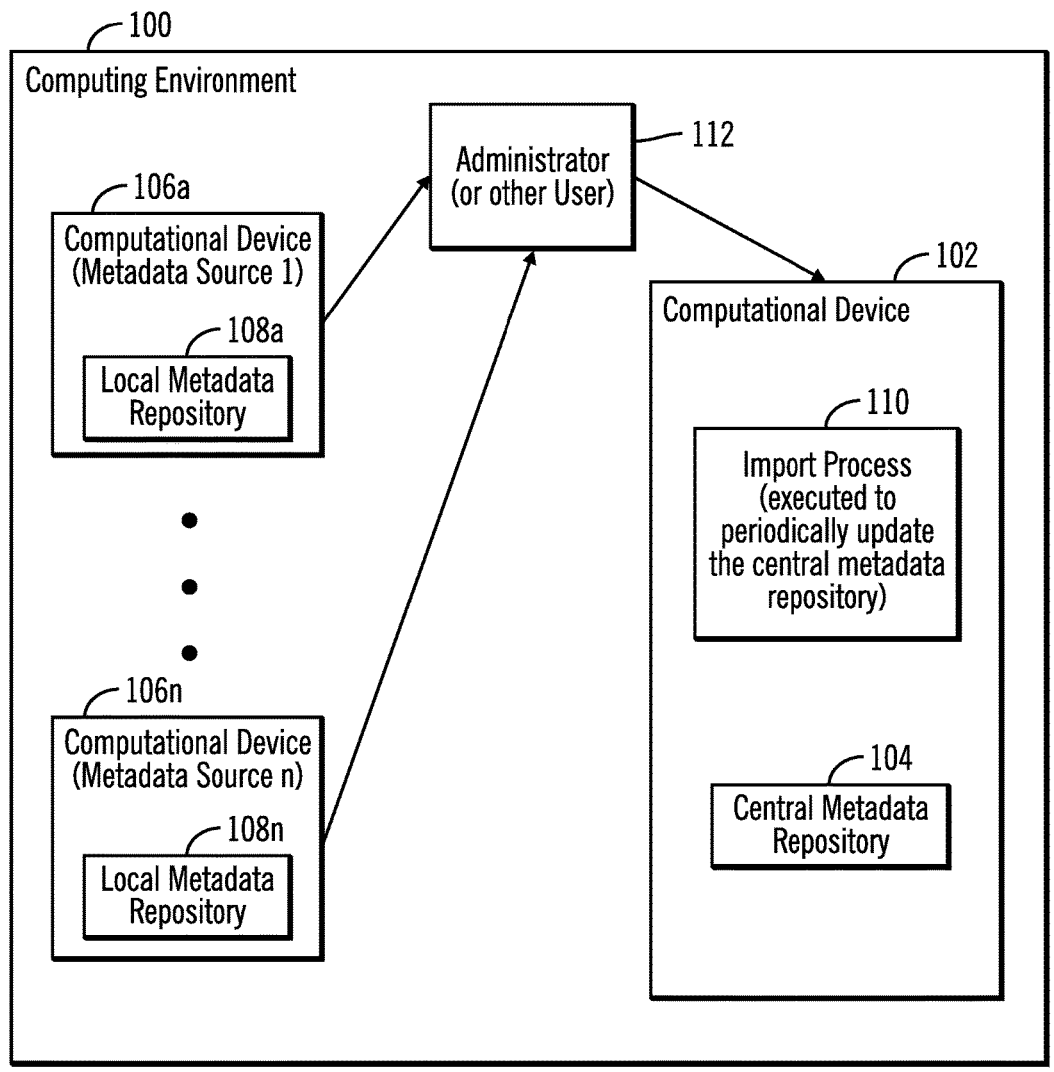
FIG. 1 illustrates a block diagram of a computing environment in which an import process periodically updates a central metadata repository, in response to changes to one or more local metadata repositories, in accordance with certain embodiments.

FIG. 1 illustrates a block diagram of a computing environment 100 in which a computational device 102 that includes a central metadata repository 104 is coupled over a network (not shown) to a plurality of computational devices 106a . . . 106n, where each of the plurality of computational devices 106a . . . 106n includes a local metadata repository (e.g. metadata repositories 108a . . . 108n).

The local metadata repositories 108a . . . 108n may also be referred to as source metadata repositories, and the central metadata repository 104 may also be referred to as a global metadata repository. Each of the local metadata repositories 108a . . . 108n functions as a metadata source for the central metadata repository 104.

The computational device 102 may execute an import process 110, implemented in hardware, software, firmware, or any combination thereof, to periodically update the central metadata repository 104 with information from the local metadata repositories 108a . . . 108n. An administrator or other user 112 may periodically request the import process 110 to be executed to maintain the central metadata repository 104 in synchronization with the local metadata repositories 108a . . . 108n.

In the centralized repository architecture shown in FIG. 1, the content of the central metadata repository 104 may frequently be out of date. Updates to content may be performed at the discretion of the administrator or user 112, often leading to a significant time lag between the creation, update or change of metadata in a local metadata repository 108a . . . 108n, and the time that the altered metadata is reflected in the central metadata repository 104. As a result the metadata in the central metadata repository 104 may be "stale" at certain times, i.e., the metadata in the central metadata repository 104 is not up to date and is different from the local metadata repositories 108a . . . 108n.

To counter this significant time lag and other problems, federated or "virtual" repositories that rely on federated workspaces have been proposed. In federated repositories, detailed metadata content may remain in the local metadata repositories. The federated repository may offer a simple summary view. However, the federated repository may lack sufficient detail to distinguish among similar metadata, resulting in metadata objects that should be different, to appear to be the same. Additionally, queries and reporting may be slow, because the local metadata repositories may have to be interrogated for additional detail, again and again, each time a query is executed.

Figure 2:
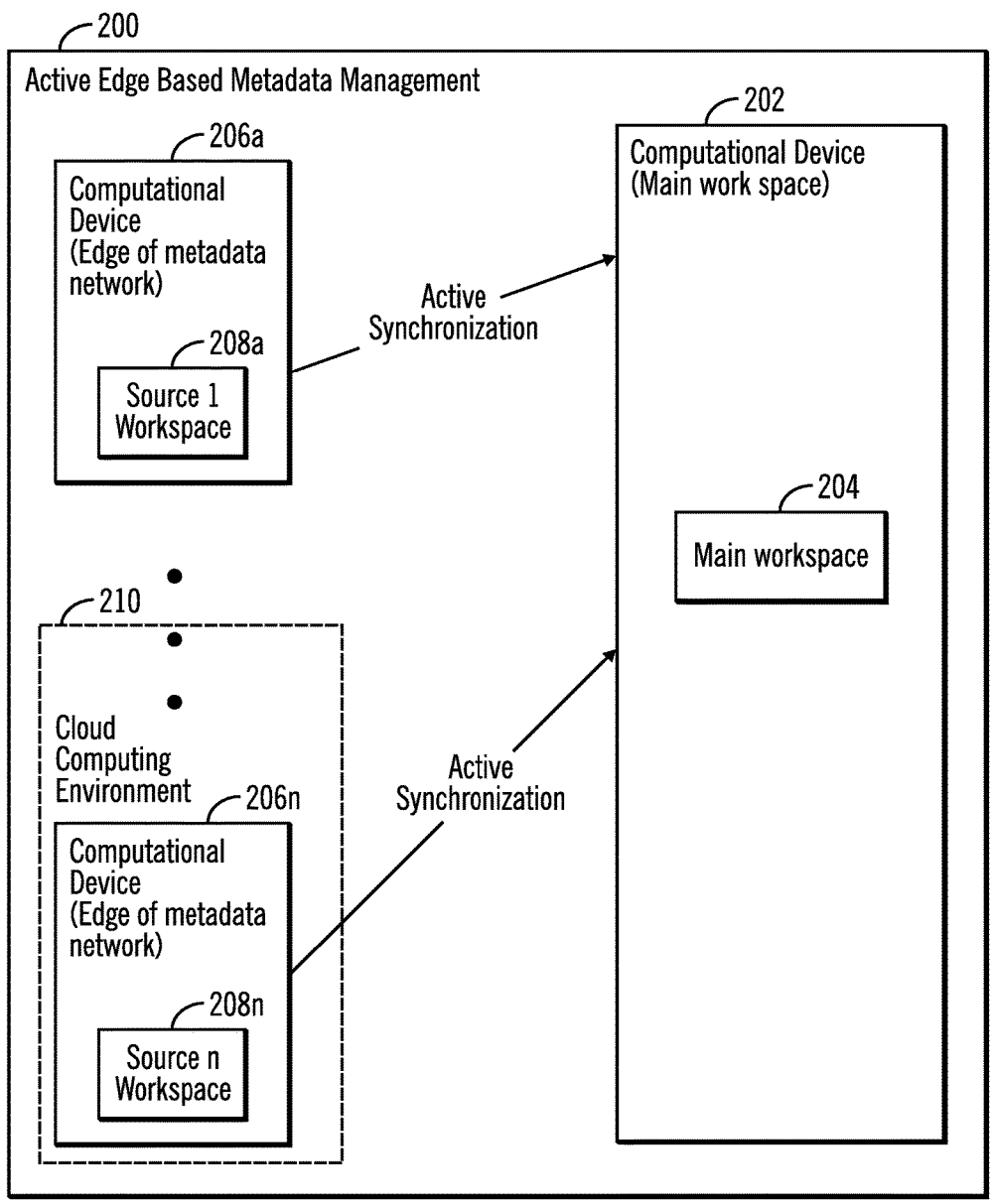
FIG. 2 illustrates a block diagram of a computing environment for active edge based metadata management using federated workspaces, in accordance with certain embodiments.

FIG. 2 illustrates a block diagram 200 of a computing environment for active edge based metadata management using federated workspaces, in accordance with certain embodiments. A computational device 202 that includes a main workspace 204 (corresponding to a central metadata repository) is coupled over a network (not shown) to a plurality of computational devices 206a . . . 206n, where each of the plurality of computational devices 206a . . . 206n includes a source workspace (e.g. source workspaces 208a . . . 208n). At least some of the source workspaces (e.g., "source n workspace" 208n) may reside in computational devices (e.g. computational device 206n) that are included in a cloud computing environment 210.

The computational devices 202, 206a . . . 206n may comprise any suitable computational device including those presently known in the art, such as, a personal computer, a workstation, a server, a mainframe, a hand held computer, a palm top computer, a telephony device, a network appliance, a blade computer, a processing device, etc. The computational devices 202, 206a . . . 206n may be elements in any suitable network, such as, a storage area network, a wide area network, the Internet, an intranet. In certain embodiments, some or all of the computational devices 202, 206a . . . 206n may be elements in a cloud computing environment 210.

A workspace (such as 204, 208a . . . 208n) hosts one or more metamodels that describes its content or "metadata", and a persistence mechanism implemented in certain embodiments via a relational database. Each workspace may independently respond to queries about its content, and maybe backed up, moved, or restored.

Certain embodiments may address the issues with metadata being "stale" by positioning active workspaces at the sources of the metadata which are the "edges" of the metadata network. In such embodiments these edge workspaces 208a . . . 208n may be the source of persistence.

The term "edge" refers to an extremity of a metadata graph. At the boundaries of the metadata graph the components that are contributing metadata to the graph may be present. So in an exemplary database "Sales" may be an edge, as may be a model in a tool like IBM* InfoSphere* Data Architect. The term "active edge" (or "active edges") is used in the disclosure because the disclosure allows for local persistence at the source which can be integrated with the rest of the metadata graph.

* IBM, zSeries, pSeries, xSeries, BladeCenter, WebSphere, and DB2, InfoSphere are trademarks of International Business Machines Corporation registered in many jurisdictions worldwide.

In other embodiments, a workspace may be configured such that a tool may monitor for changes to its native metadata storage. When changes are detected that metadata is immediately imported into the main workspace 204.

Figure 3:
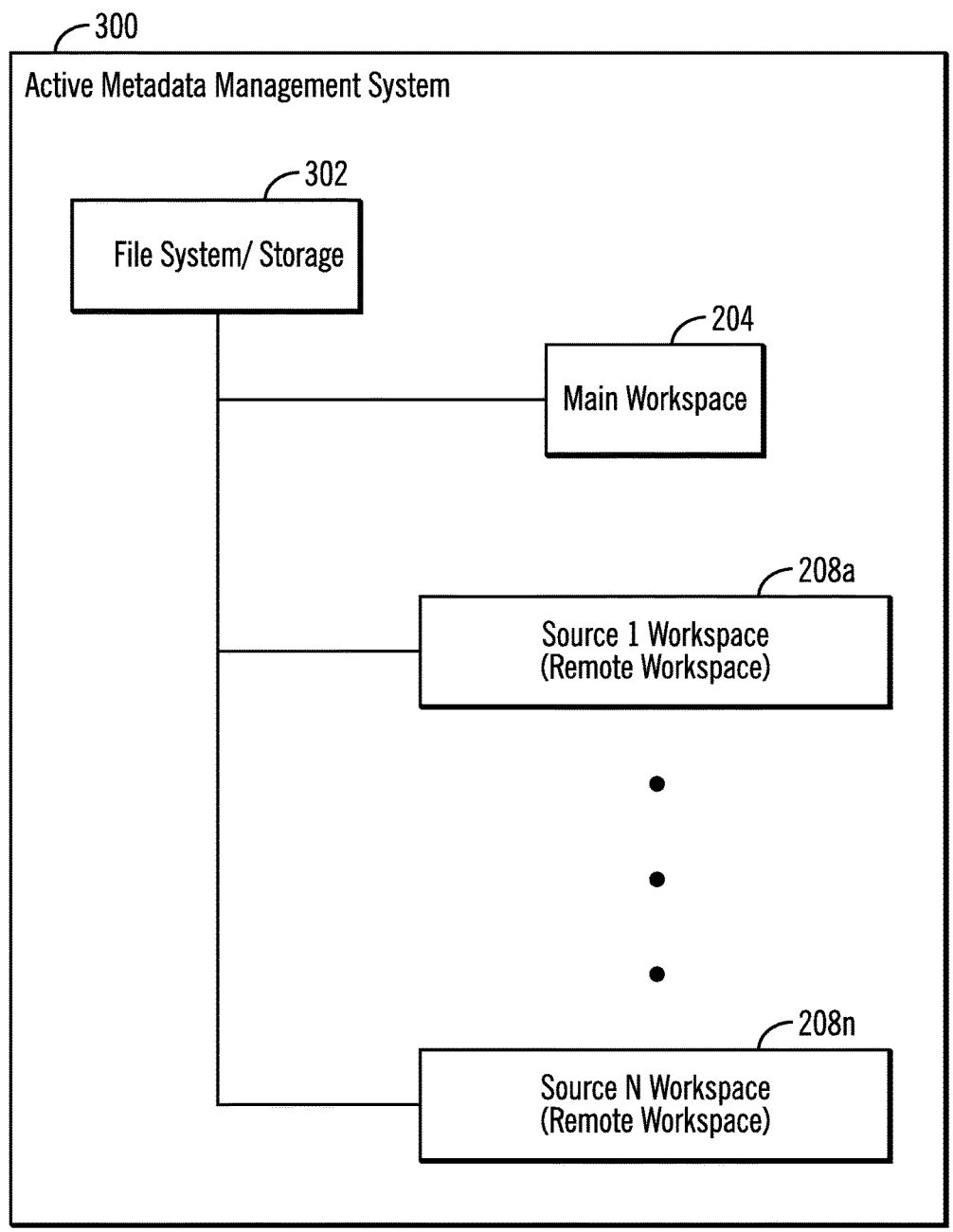
FIG. 3 illustrates a block diagram of another computing environment for an active metadata management system using federated workspaces, in accordance with certain embodiments.

FIG. 3 illustrates a block diagram 300 of another computing environment for an active metadata management system using federated workspaces, in accordance with certain embodiments.

Certain embodiments may assemble the workspaces 204, 208a . . . 208n, into one or more groups, where each group becomes a unit of query. These workspaces may be located anywhere in the network, including being located with many of the metadata sources of interest. Certain embodiments include the ability to dispatch a query to a named group, which in turn dispatches the query to each of its constituent workspaces, and then assembles and returns the combined results. From an end user's point of view this may look similar to a directory or folder structure, as illustrated via the file system 302, except that one or more of the directories or folders may be a remote workspace (i.e., the source workspaces 208a . . . 208n), as shown in FIG. 3.

An important aspect of certain embodiments is that by using similar models, with compatible notions of "identity" and a common set of import mechanisms, comparable results may be obtained from the disjoint workspaces. This allows certain embodiments to determine if two or more workspaces are reporting metadata about the same external artifact.

The result of applying certain embodiments is an architecture where metadata is managed but is still essentially "live". In addition, the flexible mechanism for assembling workspaces into groups means that that queries may be dispatched to a subset of workspaces, based on topic, project and activity, aiding in the overall performance and scalability of the architecture.

Certain embodiments focus on establishing a consistent notion of identity across what may be disjoint models, and lets queries be processed locally by individual metadata management systems. Certain embodiments provide a central grouping mechanism to dispatch queries independent of the content of the actual query. There is no need to recognize if data on the different file systems is actually the same. In certain embodiments the information that is managed (metadata) is distributed, and potentially used actively in a local manner. Semantic identifiers are used to reach across content stores for similar elements. Certain embodiments provide distributed metadata nodes that communicate only in response to a central request for information, and not on a peer to peer basis. Certain embodiments may allow for heterogeneous representations and use a semantic identifier (ID) as a key between metadata elements in the different systems. No central store of IDs is maintained. Instead, each node in a management graph, may be a fully functioning local repository.

Figure 4:
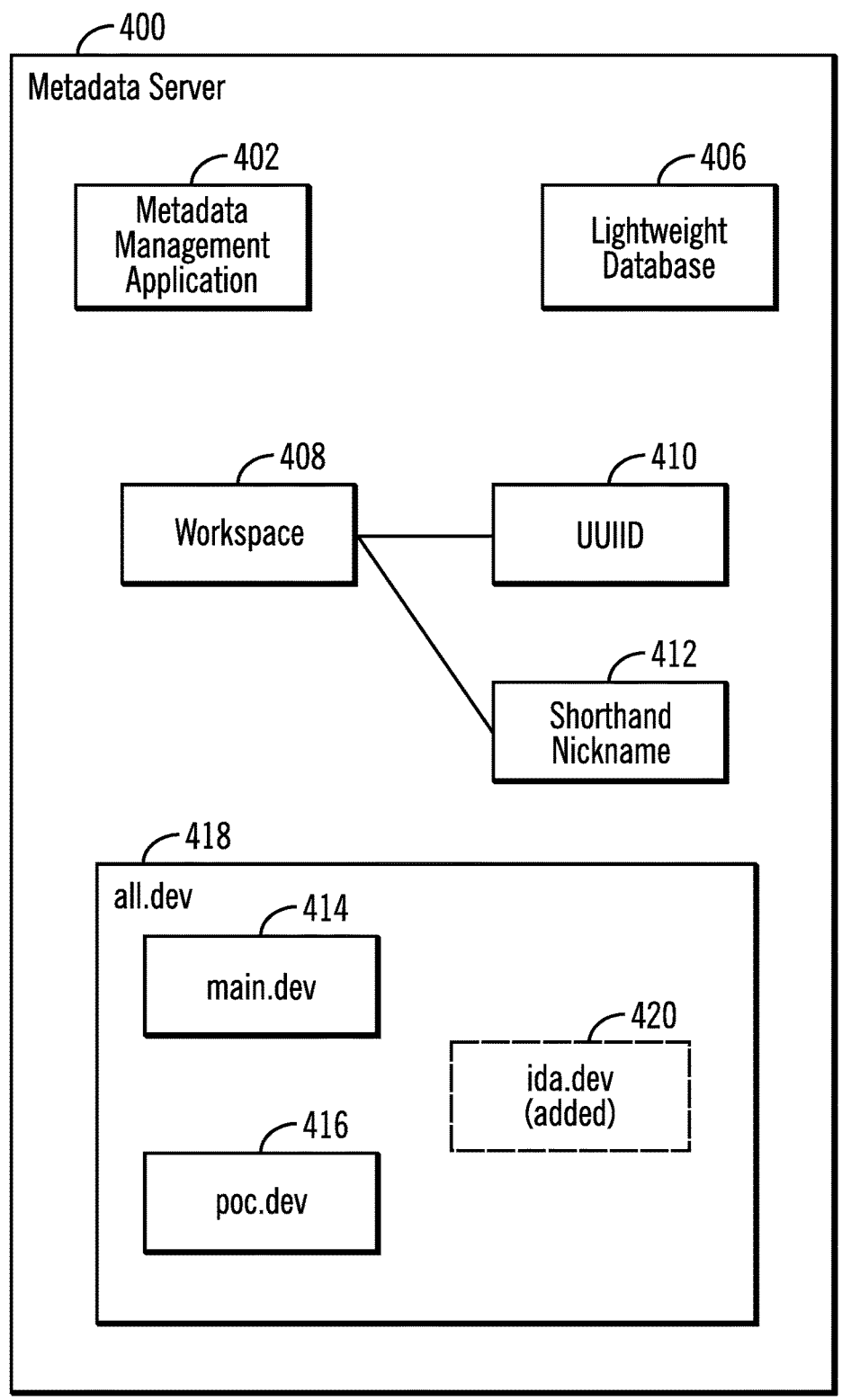
FIG. 4 illustrates a block diagram of a metadata server that implements grouping of federated workspaces, in accordance with certain embodiments.

FIG. 4 shows a block diagram of a metadata server 400 that executes a metadata management application 402 for generating groups of workspaces. The metadata server 400 may correspond to one or more of the computational devices 202, 206a . . . 206n of FIG. 2 that may in certain embodiments store the main workspace 204. The metadata management application 402 is responsible for managing the persistence and services queries on behalf of one or more registered metamodels. The metadata management application 402 uses relational databases for its persistence.

In certain embodiments, the metadata management application 402 is paired with a very lightweight database 406. Based on the pairing of the metadata management application 402 and the lightweight database 406, in certain embodiments one or more workspaces 408 may be created on any machine where the pair are installed. Each of these workspaces is named with a Universally Unique Identifier (UUID) 410, as well as a shorthand "nickname" 412 that may be used in many operations as an alternative to the UUID.

Each workspace may be persisted as a lightweight database 406. Each workspace may have independent security credentials, ensuring that access to the workspace is restricted.

In certain embodiments workspaces may assembled into "Groups". A group is a collection of workspaces for some particular purpose. For example, given a workspace dedicated to a main development activity and perhaps referred to as main.dev 414 and another workspace set aside for some proof of concept work and nicknamed, poc.dev 416, a user may create a group, perhaps named all.dev 418 containing main.dev 414 and poc.dev 416. The details of the network location, as well as the access credentials for each workspace are managed within the group and its workspaces. A query sent to the group is dispatched to each of its members. So in this example, a query sent to the group all.dev 418, may be dispatched to each of its individual workspaces, main.dev 414 and poc.dev 416, and the results collected and returned.

To address the difficulties presented by traditional import/export mechanisms for bringing metadata in to a metadata management system, in certain embodiments a workspace may be associated with each source system of interest. For some systems this may mean using a workspace as the native metadata store for the application. As an example, a tool may be designed such that it persists its metadata directly to a local workspace. This approach is applicable when the metadata source tool can be modified to write directly to a workspace.

In cases where the source tool cannot be modified, certain embodiments may still associate a workspace with that source tool, but make use of an "active" monitoring approach. Certain tools may persist their metadata as files in a local file system. By observing the date and time stamp on such files, a determination may be made as to when the metadata has changed. When the metadata changes, it can substantially immediately be imported into the local workspace for that instance of the source tool. In such embodiments, a workspace may be configured as an active monitor of a source system for changes. Any changes or updates in the source systems metadata, detected as changes to its metadata files, are observed, and reacted to, by immediately initiating the import of the changed files, into the local workspace.

Revisiting the group example shown via all.dev 418, certain embodiments may add a new workspace ida.dev 420 to the group all.dev 418. Now any query sent to all.dev 418 will substantially immediately include metadata in the previous workspaces, main.dev 414, and poc.dev 416 as well as ida.dev 420.

The consistent naming and identity standards across the disjoint workspaces, ensures that certain embodiments provide mechanisms to accurately identify metadata in any of these three workspaces as referencing the same external artifact.

So if a user has references to a data model element in main.dev 414 that is a Table named "Customer" in a Schema called "HighValueCustomers", the user can immediately see if the data model in ida.dev 420 is referring to the same data model elements, perhaps with updated information. This edge centric approach allows certain embodiments to blend the consistent semantics of a centrally managed metadata repository, with the live metadata referencing available through virtual or federated metadata schemes.

Therefore, FIG. 4 illustrates a mechanism for utilizing a universally unique identifier (UUID) to uniquely reference an object common to the least two different distributed federated workspaces.

Certain embodiments provide mechanism for naming and providing identity. For such embodiments, the following definitions are used:

1) Model: A Model is a defined set of Classes, with Attributes representing values of interest for each class, and Associations defined to capture relationships of interest between classes.

2) Object: An object is an instance of a class in a particular model.

3) Identity: An ordered set of textual elements that when delimited and concatenated creates a textual string that serves as an identifier, I for a set of objects.

4) Pred(i): The predecessor identity of i in an ordered identity definition.

5) Map(X) A semantic equivalence relationship between classes in two or more models.

6) Covers(I) A group of non empty subsets of an identity I, such that their union contains the set I with no duplicates.

Certain embodiments define identity schemes for two representative systems, a Central system, C, and a remote system, R. Central, or C, represents the common semantic view to which one or more Remote, or R, systems are being integrated with. The central system may correspond to the main workspace 204, wherein the remote systems may correspond to the source workspaces 208*a* . . . 208*n*.

FIG. 5 illustrates a block diagram 500 that shows operations performed by the central system, in accordance with certain embodiments. For the central system the following operations are performed:

1. Create classes to represent the corpus of information required for the system (block 502).
2. For each class, define the attributes and associations of interest (block 504).
3. For each class, select an attribute to serve as an element, i in the identity string I for instances of that class (block 506).
4. Define an identity ordering amongst classes. This typically follows abstractions like containment (block 508).
5. Let the identity, I for any object of a particular class be its identity, i, concatenated to Pred(i). (block 510)

FIG. 6 illustrates a block diagram that shows operations performed by a Remote system, in accordance with certain embodiments. For the Remote system the following operations are performed:

1. Create classes to represent the corpus of information required for the system.
2. For each class, X, define the attributes and associations of interest.
3. If the class X is intended to be shared with Central, find a class, Y in C such that Map(X) holds.
4. For each class, X, select an attribute to serve as an element, i in the identity string I for instances of that class. (a) If class X is mapped such that Map(X)=Y, the selected identity attribute i should be semantically compatible with the identity attribute previously defined for Y
5. Define an identity ordering amongst classes. This typically follows abstractions like containment.
6. Let the identity, I for any object of a particular class be its identity, i, concatenated to Pred(i).
7. In some cases, $I_{remote}$ for a class X in Remote where there exists an Y in Central such that Y=Map(X), can have additional attribute elements in its Identity. This produces the case where $$I_{remote} = \text{Covers}(I_{central})$$

This represents the case where the remote system may have a more granular representation of a concept than the central system. In this situation these several remote objects will be mapped to, and represented by a single central object. It should be noted that for consistent responses to queries in terms of $I_{central}$ the remote system will have to uniformly map $I_{central}$ to $I_{remote}$ by using a local function or via some other means.

It should be noted that embodiments do not allow the case where, $$I_{central} = \text{Covers}(I_{remote})$$

as it results in a situation where the remote system lacks sufficient detail to participate in semantically consistent queries.

Figure 7:
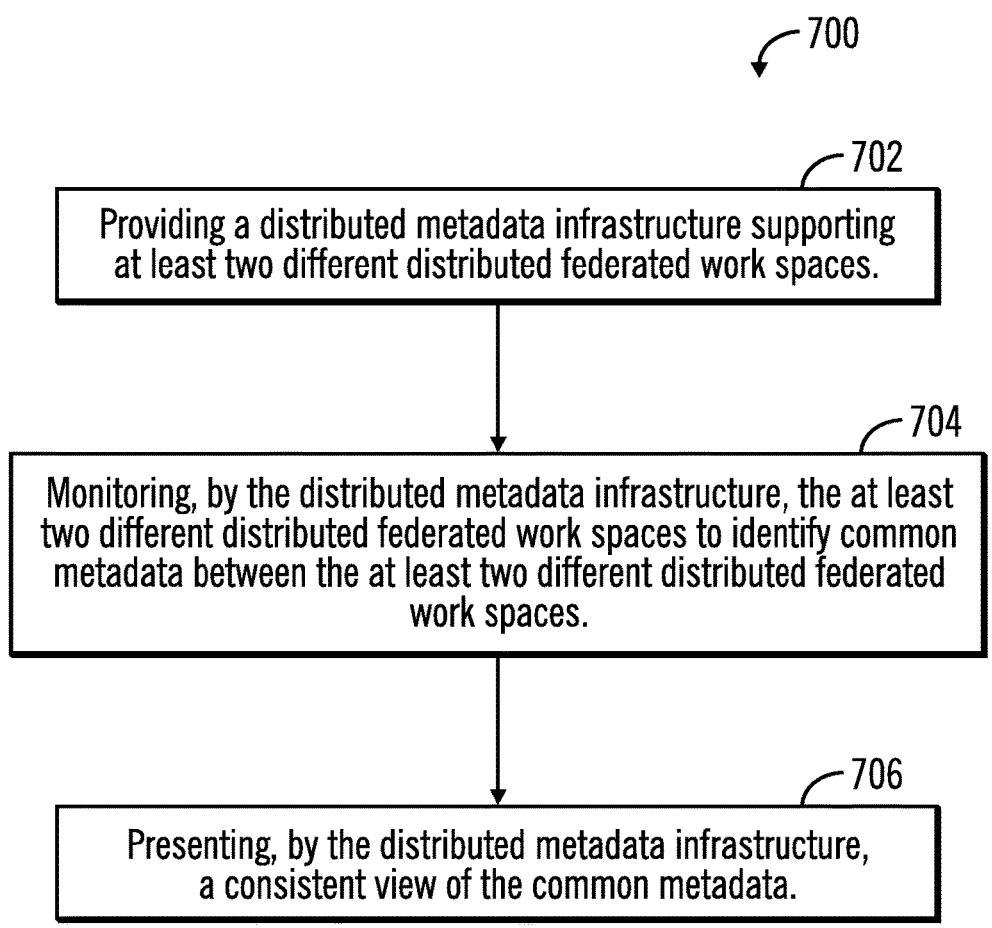
FIG. 7 illustrates a flowchart that shows operations related to the federated management of a plurality of metadata storage mechanisms, in accordance with certain embodiments.

FIG. 7 illustrates a flowchart 700 that shows operations related to the federated management of plurality of metadata storage mechanisms, in accordance with certain embodiments. The operations shown in FIG. 7 may be implemented in one or more applications that execute in the one or more of the computational devices 202, 206*a* . . . 206*n*.

Control starts at block 702 in which a distributed metadata infrastructure is provided for supporting at least two different distributed federated workspaces (e.g. workspaces selected from 204, 208*a* . . . 208*n*). The distributed metadata infrastructure monitors (at block 704) the at least two different distributed federated workspaces to identify common metadata between the at least two different distributed federated workspaces. The distributed metadata infrastructure presents (at block 706) a consistent view of the common metadata.

Therefore, FIGS. 1-7 illustrate certain embodiments related to the federated management of plurality of metadata storage mechanisms. Compatibility is maintained between global and local metadata in a federated management system, while at the same time allowing the local metadata to contain additional information specific to the local environment.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
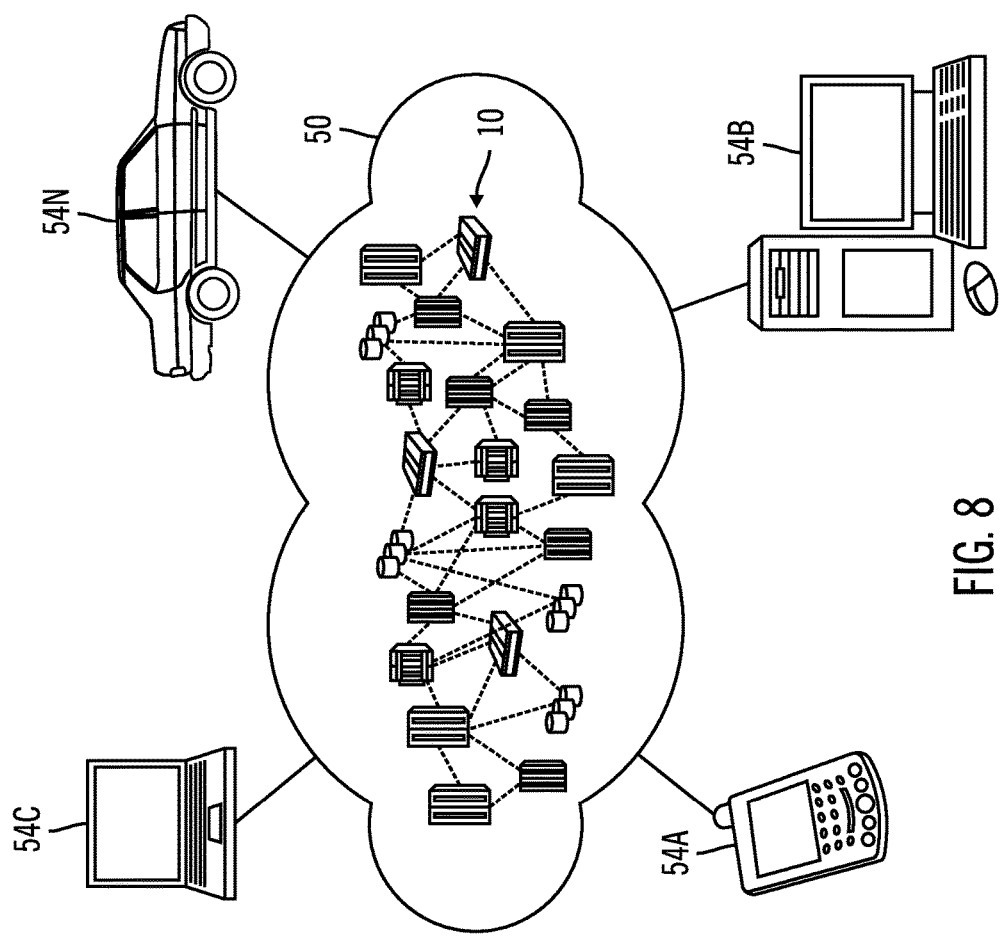
FIG. 8 illustrates a block diagram of a cloud computing environment, in accordance with certain embodiments.

Referring now to FIG. 8, an illustrative cloud computing environment 50 (that may correspond to the cloud computing environment 210 shown in FIG. 2) is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
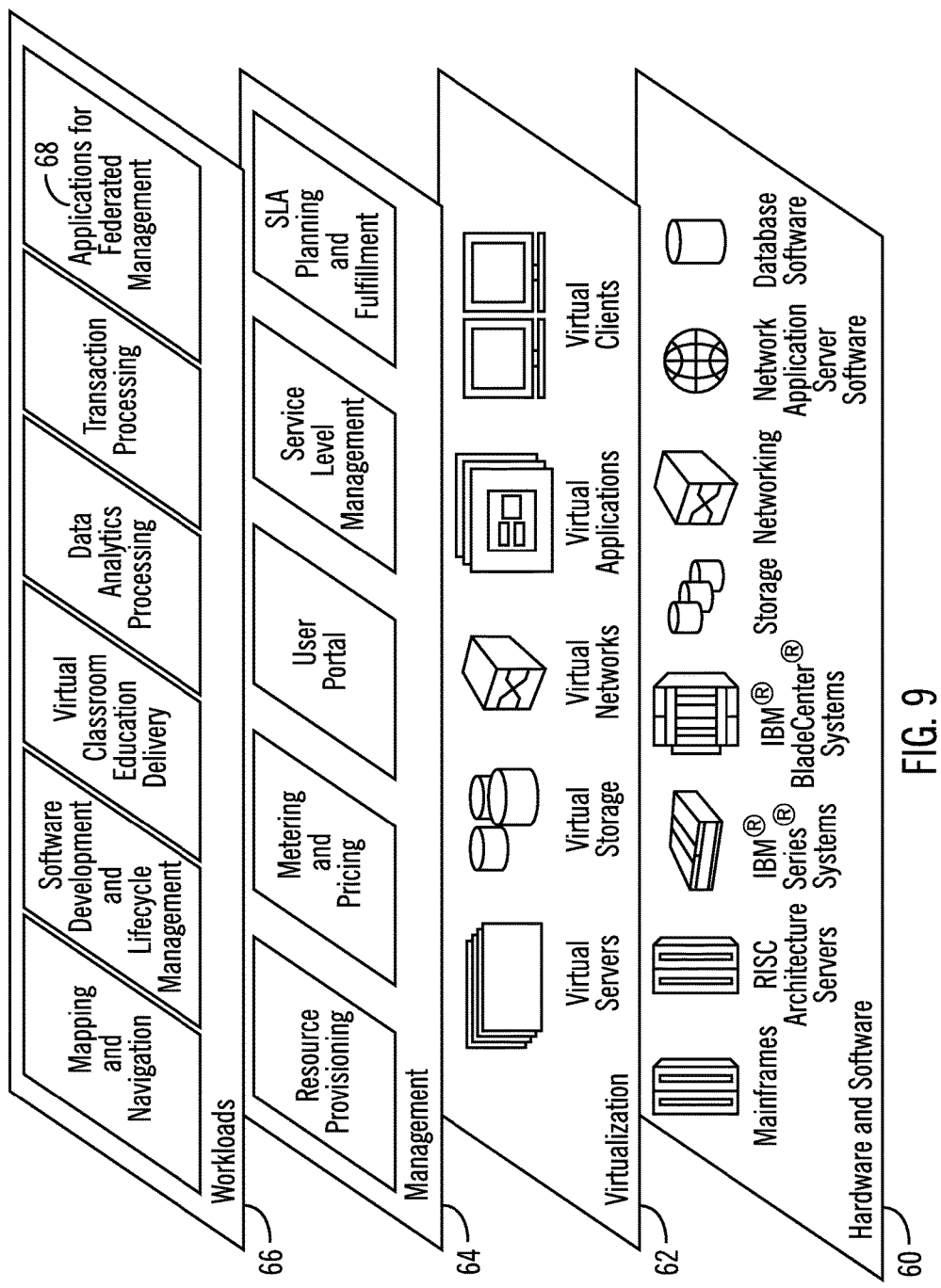
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and applications 68 for federated management of database management systems as described in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
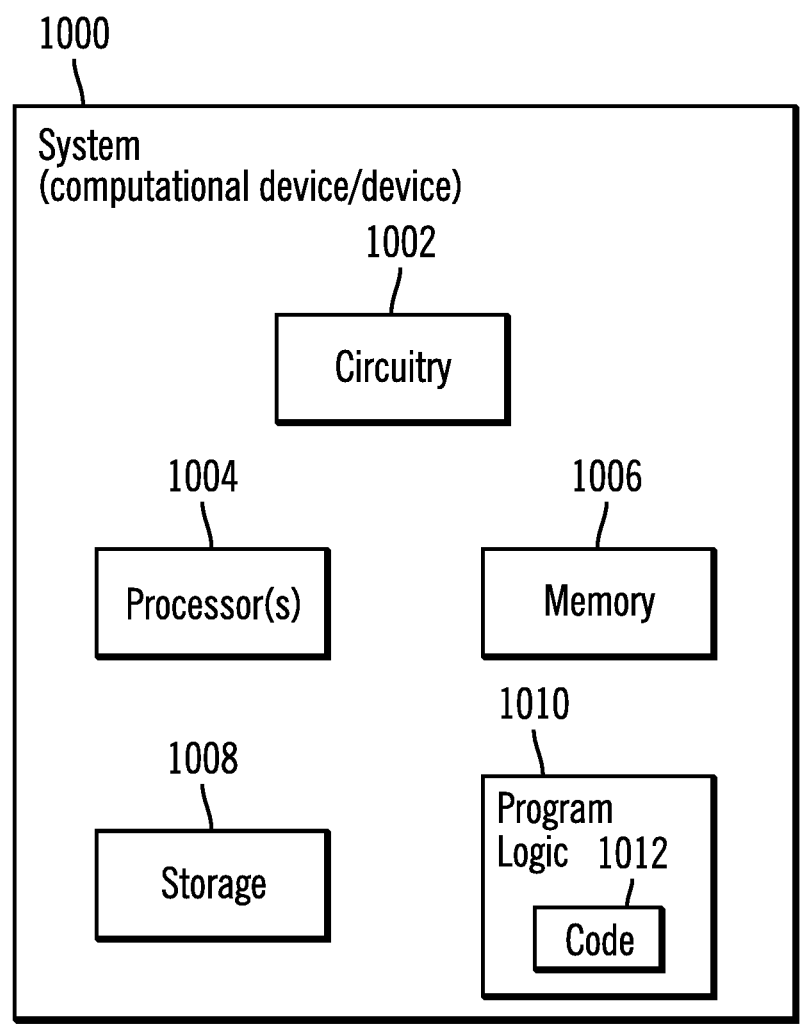
FIG. 10 illustrates a block diagram of a computational system that shows certain elements that may be included in the central system and remote systems, in accordance with certain embodiments.

FIG. 10 illustrates a block diagram that shows certain elements that may be included in one or more of the computational devices 202, 206a . . . 206n in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method for managing metadata for different distributed federated workspaces comprising:
   generating classes to represent information required by a central system that is coupled to a remote system;
   for each class, defining attributes and associations of interest;
   for each class, selecting an identity attribute to serve as an element in an identity string for instances of the class;
   defining an identity ordering among the classes;
   concatenating an identity to a predecessor identity in an ordered identity definition to determine identity for an object of a class in the central system, wherein in response to determining by the remote system that a class in the remote system is intended to be shared with the central system, determining a class in the central system such that a semantic equivalence relationship holds between the class in the remote system and the determined class in the central system, wherein the semantic equivalence relationship holds if a selected identity attribute in the class of the remote system is semantically compatible with an identity attribute previously defined for the determined class in the central system, wherein a plurality of remote objects in the remote system are mapped to a single object in the central system based on holding of semantic equivalence relationships via the remote system determining a class Y in the central system such that Map(X) that represents a semantic equivalence relationship between classes in two or more models holds for a class X to be shared with the central system, wherein a metadata source tool cannot be modified to write directly to a workspace of the remote system, and wherein the workspace of the remote system is configured to enable monitoring of a change in metadata of the remote system; and
   importing the metadata of the remote system to the central system in response to a change detected in the metadata of the remote system, by using semantic equivalence relationships, and wherein the metadata of the remote system includes additional information specific to the remote system in comparison to the central system.

2. The method of claim 1, wherein at least two different distributed federated workspaces are disjoint.

3. The method of claim 1, the method further comprising:
   assembling one or more federated workspaces into groups based on at least one of topic, project or activity to dispatch distributed queries.

4. The method of claim 1, wherein a persistence layer is used at an edge, and wherein the persistence layer that is used at the edge is maintained in a cloud computing environment.

5. The method of claim 1, the method further comprising:
   utilizing a universally unique identifier (UUID) to uniquely reference an object common to at least two different distributed federated workspaces.

6. The method of claim 1, wherein a workspace in at least two different federated workspaces has objects selected from a group consisting of documents, files, directories, videos, communities, and applications.

7. The method of claim 1, wherein the remote system has a more granular representation than the central system.

8. The method of claim 1, wherein the remote system uniformly maps an identity in the central system to an identity in the remote system by using a local function in the remote system.

9. The method of claim 1, wherein the remote system performs operations to perform:
   create classes to represent information; and
   for each class X, define attributes and associations of interest.

10. The method of claim 1, wherein the remote system performs further operations to perform:
    for each class X select an attribute to serve as an element i in an identity string I for instances of the class, wherein if class X is mapped such that Map(X) equals Y then a selected identity attribute i is semantically compatible with an identity attribute previously defined for Y;
    define an identity ordering amongst classes;
    define an identity I for any object of a particular class to be an identity i concatenated to Pred(i) that is a predecessor identity of i in an ordered identity definition; and
    if $I_{remote}$ represents an identity of a class X in the remote system where there exists an Y in the central system such that Y equals Map(X), wherein if $I_{remote}$ equals Covers($I_{central}$) then a plurality of remote objects are mapped to and represented by a single object in the central system, wherein Covers (I) represents a group of non empty subsets of an identity I, such that an union of the non empty subsets contains set I with no duplicates.

* * * * *